US006006972A

United States Patent [19]

O'Neill

[11] Patent Number: 6,006,972

[45] Date of Patent: Dec. 28, 1999

[54] DEVICE FOR ATTACHING BABY BOTTLES TO STROLLERS

[76] Inventor: James G. O'Neill, 107 New Castle La., Willingboro, N.J. 08046

[21] Appl. No.: 09/159,482

[22] Filed: Sep. 23, 1998

[51] Int. Cl.[6] .......................... F16M 13/00; A47D 15/00

[52] U.S. Cl. .......................... 224/409; 224/553; 224/558; 224/568; 224/572; 224/926; 248/103; 248/289.31

[58] Field of Search .......................... 224/409, 275, 224/414, 441, 443, 447, 448, 459, 460, 463, 545, 548, 553, 555, 558, 568, 572, 926, 197, 198; 248/102, 103, 104, 105, 289.31

[56] References Cited

U.S. PATENT DOCUMENTS

| | | | |
|---|---|---|---|
| 1,315,621 | 9/1919 | Barlow | 248/103 |
| 1,407,681 | 2/1922 | Saunders | 248/103 |
| 1,554,118 | 9/1925 | Moran | 248/103 |
| 1,688,148 | 10/1928 | Martin | 224/553 X |
| 1,688,765 | 10/1928 | Veras | 224/409 X |
| 2,711,872 | 6/1955 | Lampke | 248/103 |
| 4,877,164 | 10/1989 | Baucom | 224/926 X |
| 5,603,479 | 2/1997 | Kristy | 248/104 X |
| 5,775,654 | 7/1998 | Price | 248/103 |
| 5,839,632 | 11/1998 | Koday | 224/414 |

*Primary Examiner*—Gregory M. Vidovich
*Attorney, Agent, or Firm*—Richard L. Huff

[57] ABSTRACT

A device for attaching baby bottles to strollers or car seats having constraining bars. The device contains a holding mechanism for attaching the device to a stroller or car seat; an angular stem leading away from the holding mechanism; a hollow cylinder attached to the angular stem, the cylinder containing a connector held in place near the stem, a circular cap at the end away from the stem, and a coil spring connecting the connector and the cap; a bottle holder attached to the cap; and an adjustable strap connected to the bottle holder. The angular stem is adjustable relative to the constraining bar. Also, the coil spring allows the bottle holder to swivel around the cylinder so that when the bottle is in use, it may easily be held with the nipple at a downward angle and when not in use, it automatically positions the nipple at an upward angle.

11 Claims, 5 Drawing Sheets

DEVICE FOR ATTACHING BABY BOTTLES TO STROLLERS

BACKGROUND OF THE INVENTION

1. Field of the invention

This invention is directed to a device for attaching baby bottles to strollers and car seats.

2. Description of the related art

Devices for holding baby bottles to cribs, carriages, high chairs, car seats, and strollers are known in the art. The ideal bottle holder will be able to hold bottles having a variety of sizes and shapes, have no hard edges which will harm the baby, will be small in size as to be simple to carry when not in use, will maintain the bottle in an upright position when not in use in order to avoid spillage, and will maintain the bottle in a position which is convenient for the baby in that it is within easy sight and reach.

The device shown in U.S. Pat. No. 1,178,594 to Nixon et al satisfies many of these conditions, but is large and unable to be transported conveniently. Additionally, there are hard edges which may be injurious to the baby. The devices shown in U.S. Pat. No. 4,630,793 to Hunter and U.S. Pat. No. 5,192,041 to Bryant appear to have the tendency to maintain the bottle in a position wherein the nipple points downward when not in use, thus yielding a mess and wasting the contents of the bottle. The device of U.S. Pat. No. 5,016,845 to Pellegrino solves the problem of spillage by maintaining the bottle in an upright position when it is not in use. However, a special bottle holder is required in this device, and it is not apparent that this container would be suitable for holding bottles having a range of sizes and shapes. The device of U.S. Pat. No. 5,489,075 to Ible presents hard surfaces which could cause harm to the baby. The infant feeding apparatus shown by U.S. Pat. No. 3,251,626 to Martin requires the seat to be part of the apparatus as the seat requires a special slot in the side of the seat. Thus, this disclosure cannot provide for a simple bottle holder which can be used on a wide range of seats of strollers and car seats. The device of U.S. Pat. No. 4,718,623 to McClure is designed to be slung over a cushioned side panel of a car seat, making it necessary for the infant to engage in contortions in order to use the bottle. Also, it does not appear that this device would cause the bottle to tilt upwardly when not in use. Thus, this device does not solve the problem of dripping bottles. The devices shown by U.S. Pat. No. 4,093,165 to Sussman and U.S. Pat. No. 4,869,381 to Agner require a flat surface for their suction cups. Thus, these devices are not useable in car seats and strollers where there is no flat surface or where the flat surface is inconveniently located.

SUMMARY OF THE INVENTION

The present invention seeks to overcome the disadvantages inherent in the baby bottle holders which have been noted above while providing an inexpensive, safe, convenient bottle holder which is automatically returned to a position in which the nipple end is elevated when the bottle is not in use. The bottle holder of the present invention is capable of holding baby bottles of any conventional size and shape. The bottle holder of this invention maintains the bottle in a position which is convenient for the baby and is within easy sight and reach. The bottle holder which is the subject of the present invention contains no hard edges in areas which would tend to harm the baby.

The bottle holder of the present invention is designed for use with car seats or strollers which are equipped with constraining rods on the sides of the seat, that is, rods at the sides which will keep the baby in place. The device of the present invention is attached to one such rod in a variety of ways. One attachment mechanism is a clamp. Another attachment mechanism is a first flexible, adjustable strap. With the use of either mechanism, the device may be adjusted at the point of attachment to pivot around the attaching mechanism. The device has a stem which extends away from the attachment mechanism and contains an angle designed to bring the bottle closer to the baby. Proceeding from the stem, there is a cylinder containing a fixed connector, a coil spring mounted on the connector and a rotatable cap mounted on the spring. A bottle base and attached (second) flexible, adjustable strap allow the device to hold a baby bottle. The combination of the cylinder, fixed connector, spring and cap allows the bottle to be conveniently used by the baby and ensures that the bottle is held in a nipple-up position when not in use.

DESCRIPTION OF THE PREFERRED EMBODIMENTS

The invention will now be described in detail with reference to the above drawing, like numerals referring to like parts throughout. In the following description, the term "proximal" applies to the position toward the connection of the holding mechanism and the contraining rod and the term "distal" applies to the position toward the held baby bottle. Side view refers to a view looking along the axis of the curved bottle holder. Front or rear view refers to a view looking perpendicular to the axis of the baby bottle holder. In a front view, the bottle holder slants away from the viewer at the angle in the stem. In a rear view, the bottle holder slants toward the viewer at the angle in the stem.

Figure 1:
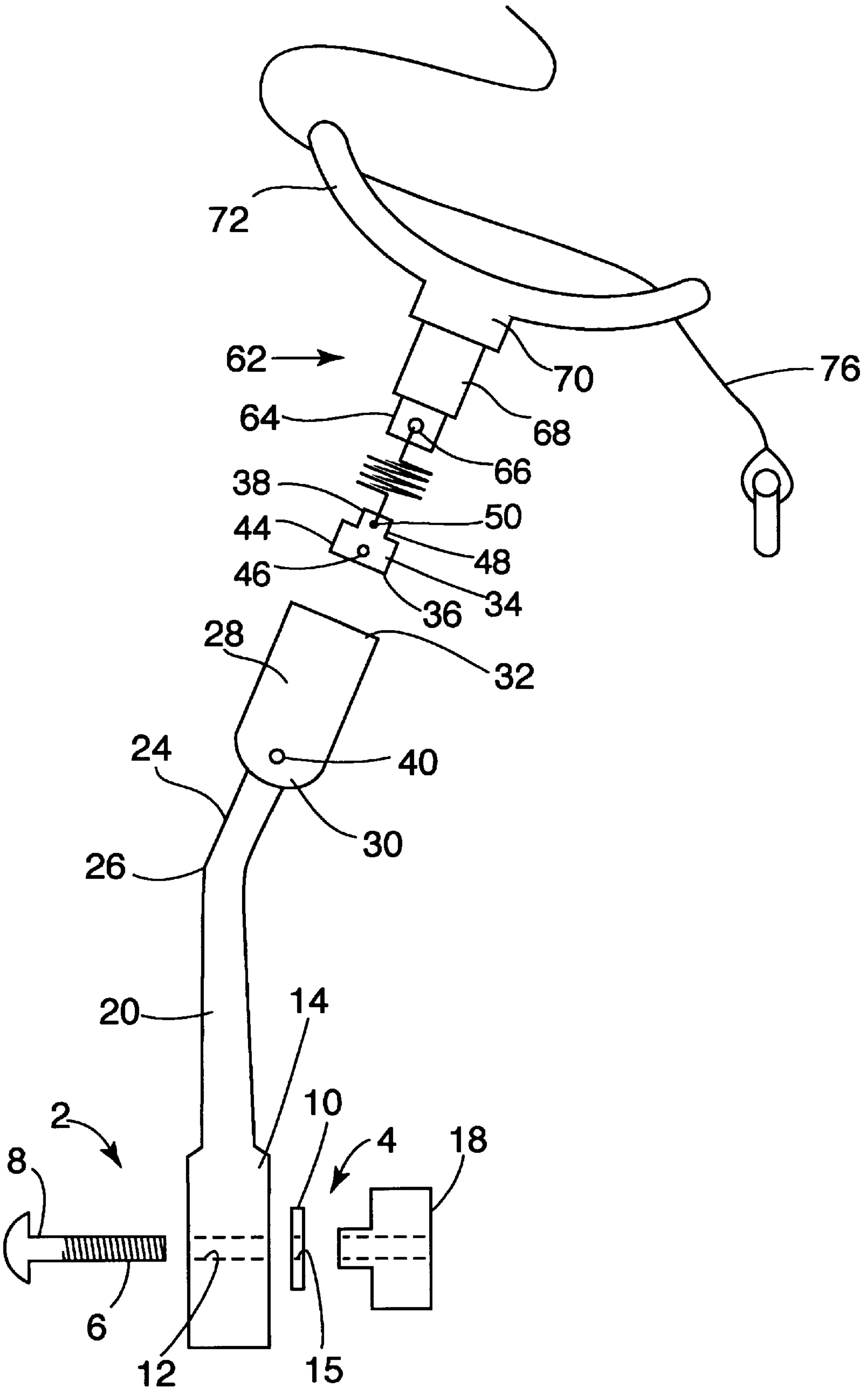
FIG. 1 is a side elevational view, partially exploded, showing the first embodiment of this invention
Figure 2:
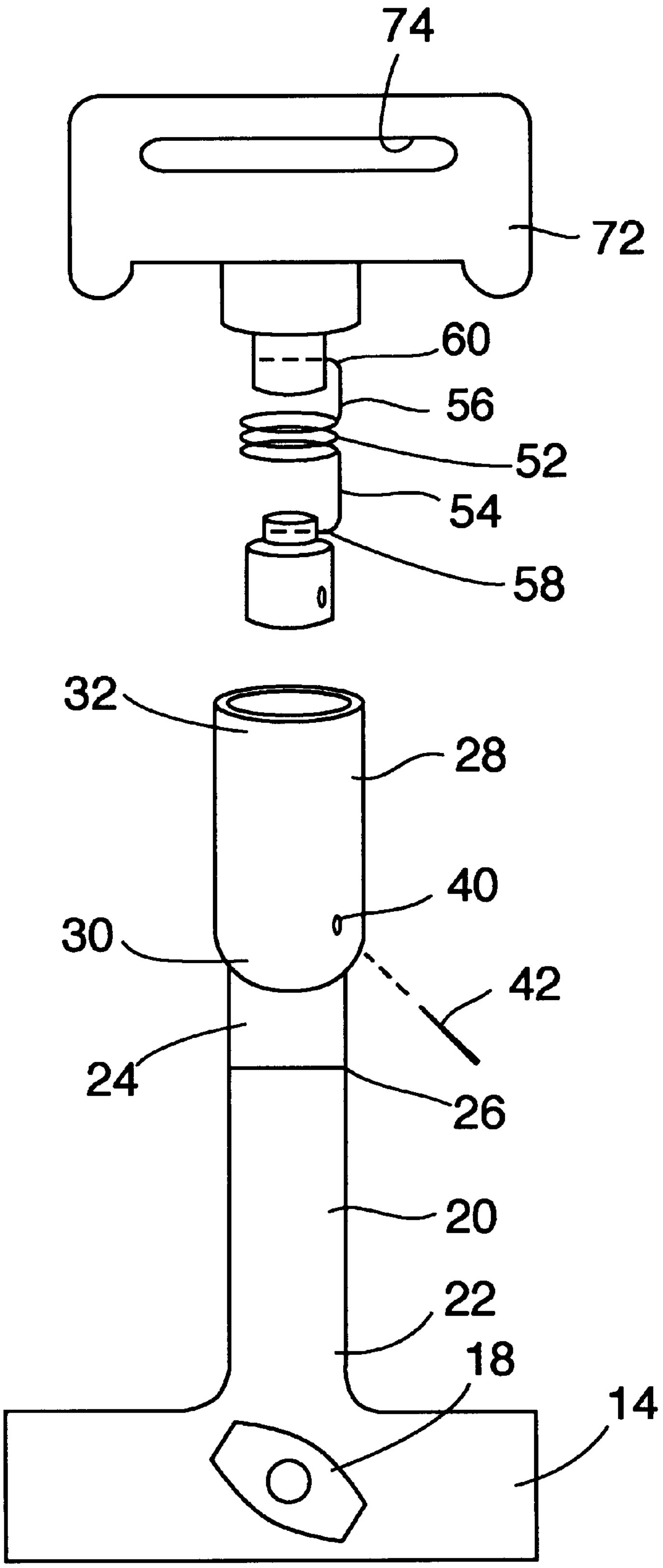
FIG. 2 is a rear elevational view, partially exploded, showing the first embodiment of this invention.
Figure 3:
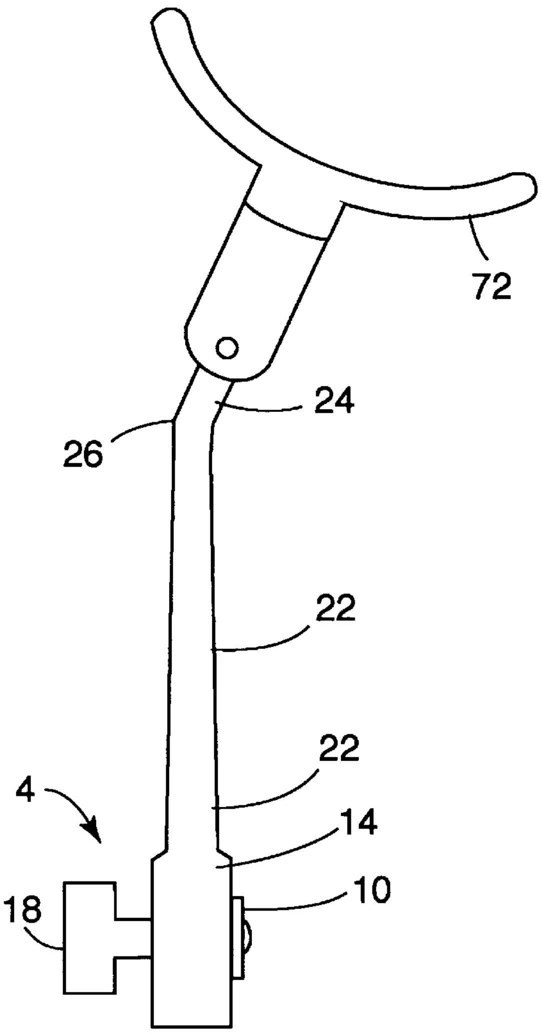
FIG. 3 is a side elevational view showing the first embodiment of this invention.
Figure 4:
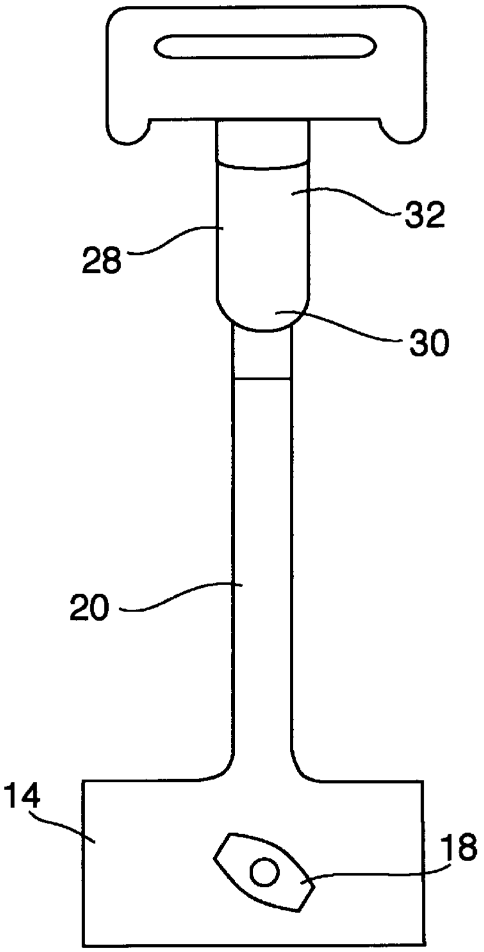
FIG. 4 is a rear elevational view showing the first embodiment of this invention.

One embodiment of the device of the present invention, shown in FIGS. 1–4, contains a proximally located holding mechanism 2 which fits onto a constraining rod (not shown). The holding mechanism 2 comprises a clamp 4 made up of a bolt 6 having a square neck 8, a first constraining piece 14 having a square hole 12 therethrough, a second constraining piece 10 having a hole 16 therethrough, and a threaded knob 18. Distally attached to the first contraining piece 14 is an angled stem 20 having a proximal end 22 and a distal end 24. The angle 26 directs the stem 20 toward the car seat or stroller at an angle of approximately 45°. As the angled stem 20 pivots about the bolt 6, the angled stem 20 can be adjusted to take a desired position and may be removably locked in that position.

A hollow cylinder 28 having a proximal end 30, a distal end 32, an inner diameter and an outer diameter extends from the distal end 24 of the angled stem 20. A circular connector 34 having a proximal end 36 and a distal end 38 is attached to the inside diameter of the hollow cylinder 28 near the proximal end 30 of the hollow cylinder 28.

In a preferred embodiment, this attachment is accomplished through a pair of opposing holes 40 in the side of the hollow cylinder 28, an anchor bar 42 traversing these holes 40, and a connector 34 attached to the anchor bar 42. The connector 34 is a two-tiered circular piece. The proximal tier 44 has a diameter approximating the inner diameter of the hollow cylinder 28. That is to say, the proximal tier 44 of the connector 34 could freely turn in the hollow cylinder 28 were it not for the anchor bar 42 maintaining it in place by the anchor bar 42 traversing a hole 46 running through the diameter of the proximal tier 44 of the connector 34. The distal tier 48 of the connector 34 is smaller in diameter than the proximal tier 44 and has a hole 50 running through its diameter. The hollow cylinder 28 is equipped with a coil spring 52 having an axis, a proximal end 54, and a distal end 56. Each end 54, 56 of the coil spring 52 has a straight section 58, 60 which runs across the diameter of the coil spring 52 perpendicular to the axis thereof The straight section 58 of the proximal end 54 of the coil spring 52 traverses the hole 50 in the distal tier 48 of the connector 34. At the distal end 32 of the hollow cylinder 28 there is a three-tiered circular cap 62: The proximal tier 64 has a diameter approximating the inner diameter of the coil spring 52. The proximal tier 64 has a hole 66 running through the diameter thereof, which hole 66 is traversed by the distal straight section 60 of the coil spring 52. The intermediate tier 68 has a diameter approximating the inner diameter of the hollow cylinder 28. That is, the circular cap 62 may turn freely within the hollow cylinder 28. The distal tier 70 has a diameter approximating the outer diameter of the hollow cylinder 28. Therefore, the intermediate tier 68 fits inside the hollow cylinder 28 and the distal tier 70 fits adjacent the distal end 32 of the hollow cylinder 28.

The three-tiered circular cap 62 has an arcuate bottle holder 72 attached thereto. This holder 72 carries two strap slots 74, one on either side of the three-tiered circular cap 62. A flexible, adjustable strap 76 runs through the two strap slots 74 and is capable of surrounding and holding a baby bottle. In accordance with the above description, the connector 34 is held fixedly in place and cannot turn. The cap 62 is held in place within the hollow cylinder 28 and does not normally move axially in the hollow cylinder 28. However, this positioning does allow for rotation of the cap 62, and accompanying arcuate holder 72, strap 76 and bottle under slight pressure which can be exerted by a baby. When such pressure is released, the coil spring 52 causes the cap 62 to return to its original position.

Figure 6:
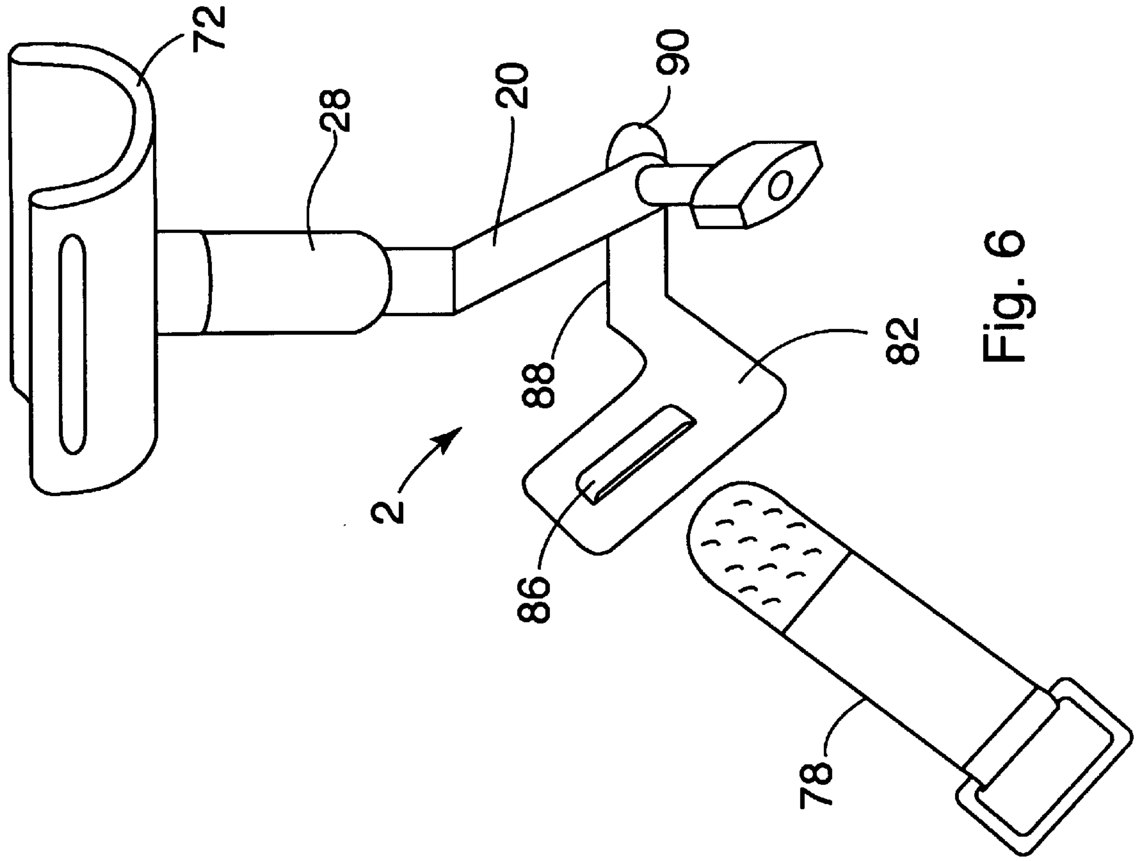
FIG. 6 is a top/rear perspective view showing the second embodiment of this invention.
Figure 5:
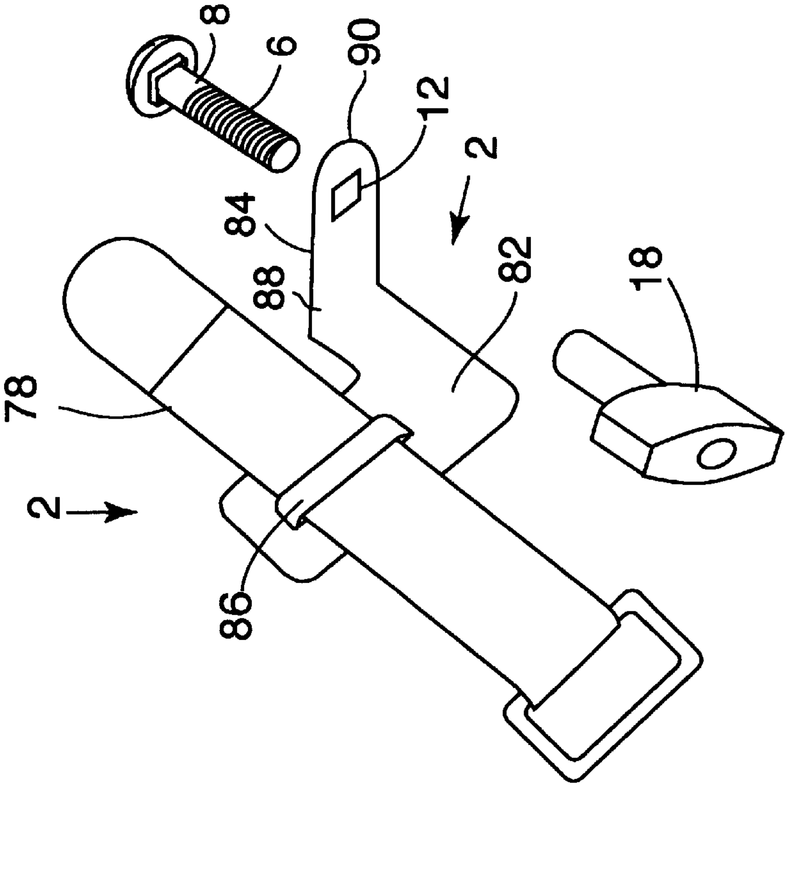
FIG. 5 is a top/rear perspective view showing the means of attachment to the constraining mechanism of the second embodiment of this invention.
Figure 8:
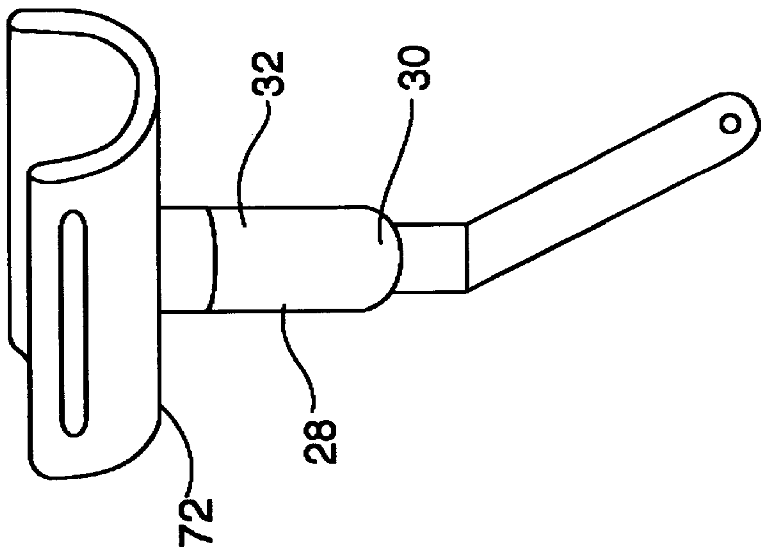
FIG. 8 is rear elevational view of the upper portion of the device of this invention.
Figure 7:
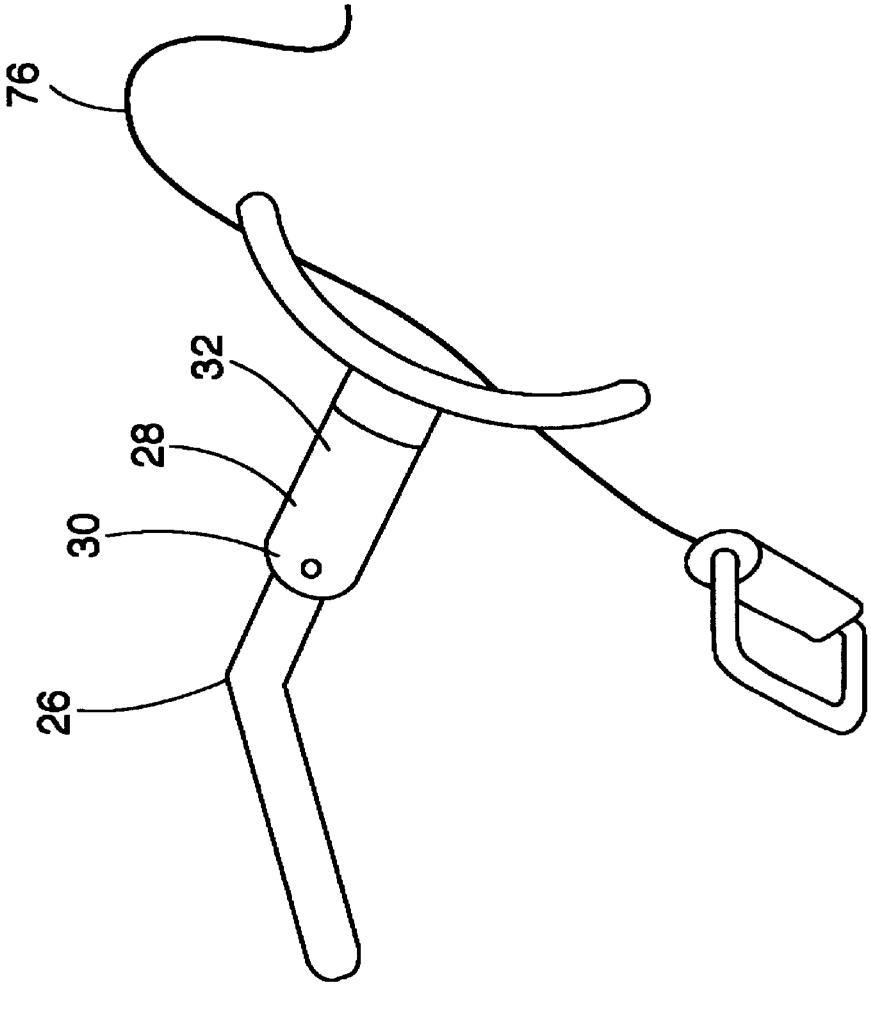
FIG. 7 is a side elevational view showing the means for attachment of a baby bottle to the device of this invention.

A second embodiment will now be described with reference to FIGS. 5–8.

In a second, most preferred embodiment there is a first adjustable strap 78 for fitting around the contraining rod. This strap 78 attaches to a holding plate 80 which has a first plane portion 82 and a second plane portion 84 which is perpendicular to the first plane portion 82. The first plane portion 82 has a bridge 86 which allows the first adjustable strap 78 to freely slide between the bridge 86 and the first plane portion 82. The second plane portion 84 has a proximal end 88 and a distal end 90. The proximal end 88 joins the first plane portion 82, and contains a square hole 12 near its distal end 90. A bolt 6 having a square neck 8 extends through, and is held in place by, the square hole 12. The bolt 6 passes through an angled stem 20 and into a threaded knob 18. In this way, the angled stem 20 can be secured in a desired position and can be easily readjusted. The portion of the device above the angled stem 20 is the same in the second embodiment as in the first embodiment. The flexible, adjustable strap 76 for holding the bottle is generally referred to as the second flexible, adjustable strap 76 to distinguish it from the first, flexible adjustable strap 78 attached to the constraining rod.

The device of the present invention is adaptable to fit a wide variety of contraining rods as the first adjustable strap 78, preferably made of Velcro, is easily adjustable for a wide range of sizes. The device may be fitted in a range of areas along the constraining rod to best accommodate for the baby's size. Fine adjustment may be made by tilting the angled stem 20 up or down and locking the stem 20 in place. The strap 76 for holding the bottle, preferably made of Velcro, will accommodate a wide variety of sizes and shapes of bottles.

While this invention has been described in detail with particular reference to preferred embodiments thereof, it will be understood that variations and modifications can be effected within the spirit and scope of the invention as described and as defined in the appended claims.

I claim:

1. A device for holding a baby bottle to a car seat or stroller, comprising:

a) a holding mechanism for attaching the device to a stroller or car seat;

b) an angular stem having a proximal end and a distal end, the proximal end being attached to the holding mechanism;

c) a hollow cylinder having a proximal end, a distal end, an inside diameter and an outside diameter, the proximal end of which is attached to the distal end of the angular stem;

d) a circular connector having a proximal end and a distal end, which connector is held in the hollow cylinder near the proximal end of the hollow cylinder;

e) a coil spring having an axis, a proximal end and a distal end, the proximal end of the coil spring being attached to the distal end of the circular connector;

f) a circular cap having a proximal end and a distal end, the proximal end of which is attached to the coil spring;

g) a bottle holder immovably attached to the distal end of the circular cap; and h) a holding mechanism for attaching a baby bottle to the bottle holder.

2. The device of claim 1, wherein:

the holding mechanism for attaching the device to a stroller or car seat is a clamp.

3. The device of claim 1, wherein:

the holding mechanism for attaching the device to a stroller or car seat is an adjustable strap.

4. The device of claim 3, wherein:

the strap is connected to the angular stem by a holding plate having a first plane portion and a second plane portion perpendicular to the first plane portion, wherein the first plane portion has a bridge which allows the adjustable strap to freely slide between the bridge and the first plane portion and the second plane portion is moveably attached to the angled stem by means of an adjustable bolt.

5. The device of claim 1, wherein:

the hollow cylinder has two opposing holes near the proximal end, an anchor bar fitting between the two holes, and the proximal end of the circular connector being attached to the anchor bar.

6. The device of claim 5, wherein:

the connector has a proximal tier and a distal tier wherein the proximal tier has a diameter approximating the diameter of the inside diameter of the hollow cylinder and has a hole passing through its diameter, which hole is traversed by the anchor bar and the distal tier has a diameter which is smaller than that of the proximal tier and has a hole passing through its diameter, which hole is traversed by a straight portion on the proximal end of the coil spring.

7. The device of claim 6, wherein:

the coil spring has a straight portion at the distal end thereof, each said straight portion perpendicular to the axis.

8. The device of claim 7, wherein:

the circular cap has a proximal tier, an intermediate tier, and a distal tier, a) the proximal tier has a diameter approximating that of an inner diameter of the coil spring and has a opening passing through the diameter thereof, which opening is traversed by the straight portion of the distal end of the coil spring;

b) the intermediate tier has a diameter approximating the inside diameter of the hollow cylinder; and c) the distal tier has a diameter approximating the outside diameter of the hollow cylinder.

9. The device of claim 1, wherein the bottle holder is arcuate in shape and has two strap slots.

10. The device of claim 1, wherein the holding mechanism for a baby bottle comprises an adjustable strap.

11. A device for holding a baby bottle to a stroller or car seat having a constraining bar, comprising:

a) a first adjustable strap for fitting around the constraining bar;

b) a holding plate having a first plane portion and a second plane portion perpendicular to the first plane portion, i) the first plane portion having a bridge which allows the first adjustable strap to freely slide between the bridge and the first plane portion and ii) the second plane portion having a proximal end and a distal end, the proximal end joining with the first plane portion, and containing a square holding opening near its distal end;

c) a bolt having a square neck held in the holding opening, which bolt passes through a hole in an angled stem and into a threaded knob, the combination of the knob, bolt and second plane portion of the holding plate allowing relative positioning between the constraining bar and the angular stem;

d) the angular stem having a proximal portion containing the hole therethrough through which the bolt passes, the angular stem having a distal portion which holds a hollow cylinder having an inside diameter, an outside diameter, a proximal end, a distal end, two opposing holes near the proximal end, and an anchor bar fitting between the two holes;

e) a two-tiered circular connector having a proximal tier and a distal tier, i) the proximal tier having a diameter approximating the diameter of the inside diameter of the hollow cylinder and having a hole passing through its diameter, which hole is traversed by the anchor bar and ii) the distal tier having a diameter which is smaller than that of the proximal tier and having a hole passing through its diameter f) a coil spring having an inner diameter, an axis, a proximal end and a distal end and having straight portions at the proximal and distal ends perpendicular to the axis, the inner diameter approximating the diameter of the distal tier of the two-tiered circular connector, and having the proximal straight portion thereof held in place by the hole passing through the distal tier of the two-tiered circular connector;

g) a three-tiered circular cap having a proximal tier, an intermediate tier, and a distal tier, i) the proximal tier of the caps having a diameter approximating that of the inner diameter of the coil spring and having an opening passing through the diameter of the proximal tier of the cap to accommodate the distal straight portion of the coil spring, ii) the intermediate tier of the cap having a diameter approximating the inside diameter of the hollow cylindrical tube, and iii) the distal tier of the cap having a diameter approximating the outside diameter of the hollow cylinder;

h) an arcuate bottle holder attached to the distal tier of the circular cap, which bottle holder contains two strap slots, one on either side of the distal tier of the circular cap; and i) an adjustable bottle strap passing through the two strap slots for holding a baby bottle to the device.

* * * * *